United States Patent [19]
Shimada

[11] Patent Number: 5,473,135
[45] Date of Patent: Dec. 5, 1995

[54] SPOT WELDING ELECTRODE

[76] Inventor: Toshiaki Shimada, 2-41-2 Kawauchi Asamiminami-ku, Hiroshima, Japan

[21] Appl. No.: 234,356

[22] Filed: Apr. 28, 1994

[30] Foreign Application Priority Data

| May 20, 1993 | [JP] | Japan | 5-142878 |
| May 24, 1993 | [JP] | Japan | 5-145547 |
| May 24, 1993 | [JP] | Japan | 5-145548 |
| May 25, 1993 | [JP] | Japan | 5-147037 |

[51] Int. Cl.$^6$ .............................. B23K 11/30
[52] U.S. Cl. ............................................ 219/120
[58] Field of Search .......................... 219/119, 120; 277/0.29

[56] References Cited

U.S. PATENT DOCUMENTS

| 2,179,693 | 11/1939 | Goldstein | 219/120 |
| 2,409,550 | 10/1946 | Dobkowski | 219/120 |
| 3,109,087 | 10/1963 | Larkworthy | 219/120 |

FOREIGN PATENT DOCUMENTS 59-119677  9/1981  Japan.

OTHER PUBLICATIONS

Z. A. Goodrich, "Welding Electrode Holder", *IBM Technical Disclosure Bulletin*, vol. 17, No. 11, Apr. 1975, pp. 3417–3419.

*Primary Examiner*—Teresa J. Walberg
*Assistant Examiner*—J. Pelham
*Attorney, Agent, or Firm*—Nikaido Marmelstein Murray & Oram

[57] ABSTRACT

A spot welding electrode includes a shank within which cooling water is communicated, and an electrode tip. The shank is provided on the top thereof with a closed head, on which the electrode tip is dismoutably fixed.

4 Claims, 8 Drawing Sheets

SPOT WELDING ELECTRODE

BACKGROUND OF THE INVENTION

1. Field of the invention

This invention relates to a spot welding electrode and an electrode tip, more particularly to an improvement in a spot welding electrode and an electrode tip used for a spot welding machine.

2. Description of the Prior Art

Figure 8:
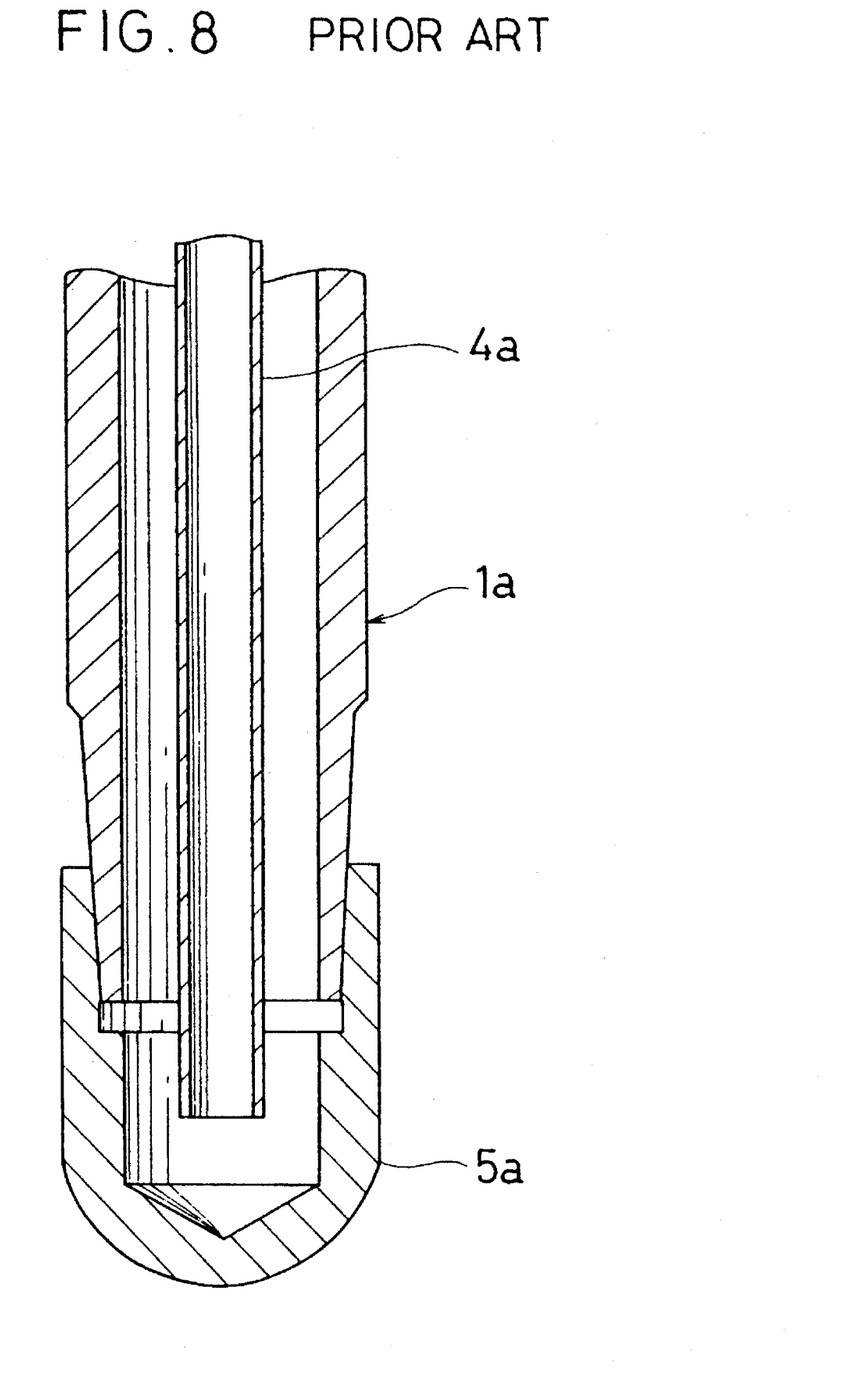
FIG. 8 is a longitudinal sectional view of a conventional spot welding electrode.

A typical conventional spot welding electrode comprises, as shown in FIG. 8, a shank 1a with a longitudinal hollow part provided therein with a cooling water pipe 4a adapted for supplying cooling water, and an electrode tip 5a dismountably fixed on the end of the shank 1a. The cooling water is supplied through the water pipe 4a and directly cools the electrode tip 5a from inside so as to prevent undesirable deformation of the electrode tip 5a because of to the welding operation.

Since it is likely that an end portion of the electrode tip 5a is worn because of to repeated welding operations, the electrode tip 5a should be frequently ground after it has been removed from the shank, or should be replaced by a new one, while stopping the cooling water supplied from the cooling water pipe 4a.

However, the spot welding electrode of this type is disadvantageous in the fact that since the electrode tip 5a is directly cooled by supplying the cooling water to the inside of the electrode tip 5a, the cooling water remaining in the shank 1a may leak to the outside and wet the working place, and thus cause rust to be developed on an object to be welded. To clean up the leaked water for further welding operation, time-consuming work becomes necessary.

Japanese Utility Model Registration Application Laid-open No. 62-3290 proposes, as a countermeasure against water leakage upon exchange or falling off of a spot welding electrode provided a water check valve at the exit of the water supply pipe, which functions such that it keeps opening while the electrode tip is mounted and automatically closes when the electrode tip is removed. This mechanism, however, cannot completely prevent water leakage and requires a complex structure, thereby causing disadvantages with respect to cost and maintenance work.

SUMMARY OF THE INVENTION

It is an object of the present invention to provide a spot welding electrode with an electrode tip that causes no water leakage when the electrode tip is replaced or falls down.

Accordingly, there is provided a spot welding electrode comprising a shank within which cooling water is communicated and an electrode tip, wherein the shank 1 is provided on the top thereof with a closed head, on which the electrode tip is dismountably fixed.

The spot welding electrode of the present invention is further characterized in that a fluid passage is dismountably fixed on the head of the shank within which cooling water is communicated, and extends to outside.

Since the shank is provided on its top with the closed head, even when the electrode tip is detached from the head of the shank, it is unlikely that the cooling water is leaked to the outside. In addition, since the electrode tip includes the fluid passage which extends to the outside, the electrode tip can be readily attached to or detached from the shank.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
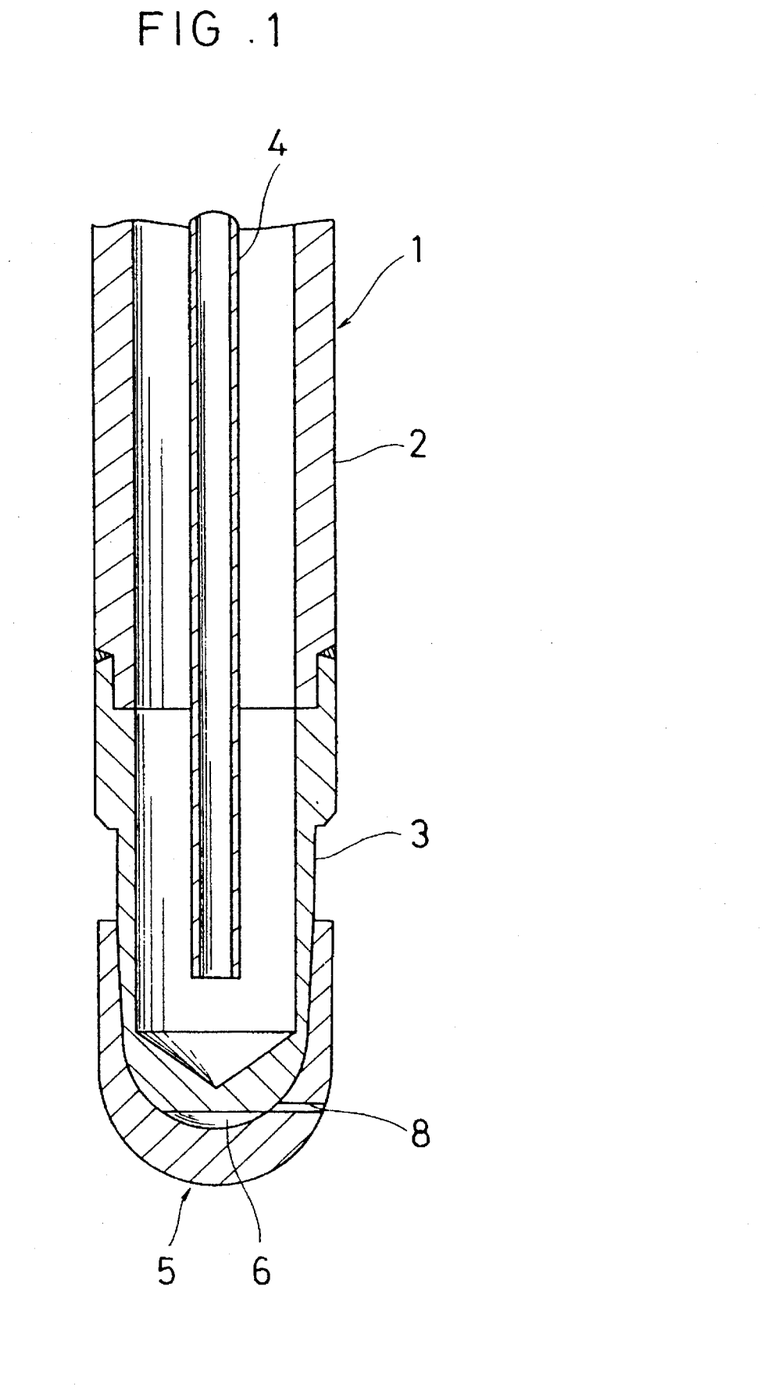
FIG. 1 is a longitudinal sectional view of an embodiment of the spot welding electrode of the present invention.

Referring to FIG. 1, a shank is generally designated by reference numeral 1. The shank 1 includes a cylindrical type shank body 2 provided on its end with a cap 3 having a closed end so as to close the end of the shank body 2. The outer periphery of the cap 3 is formed so as to become smaller in diameter as it advances towards its closed end. The cap 3 is preferably made of a material with high electrical and thermal conductivity such as a copper-containing alloy.

A cooling water pipe 4 adapted for supplying cooling water inside of the shank 1 which extends from a holder (not shown) is provided within a shank 1 along its center axis, an end of which reaches near the inside surface of the closed end of the cap 3.

Figure 2A:
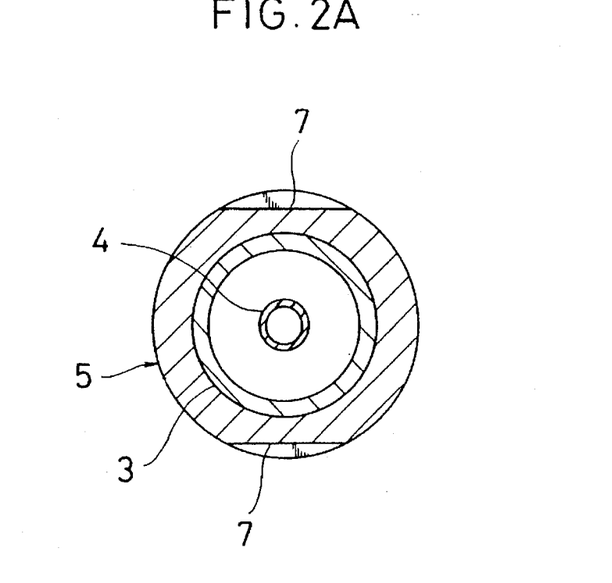
FIGS. 2A and 2B are lateral sectional views of the spot welding electrode of the present invention.
Figure 2B:
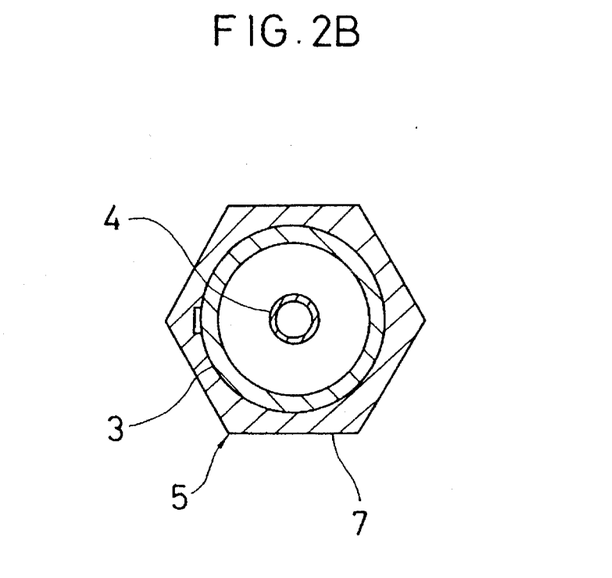
Figure 3:
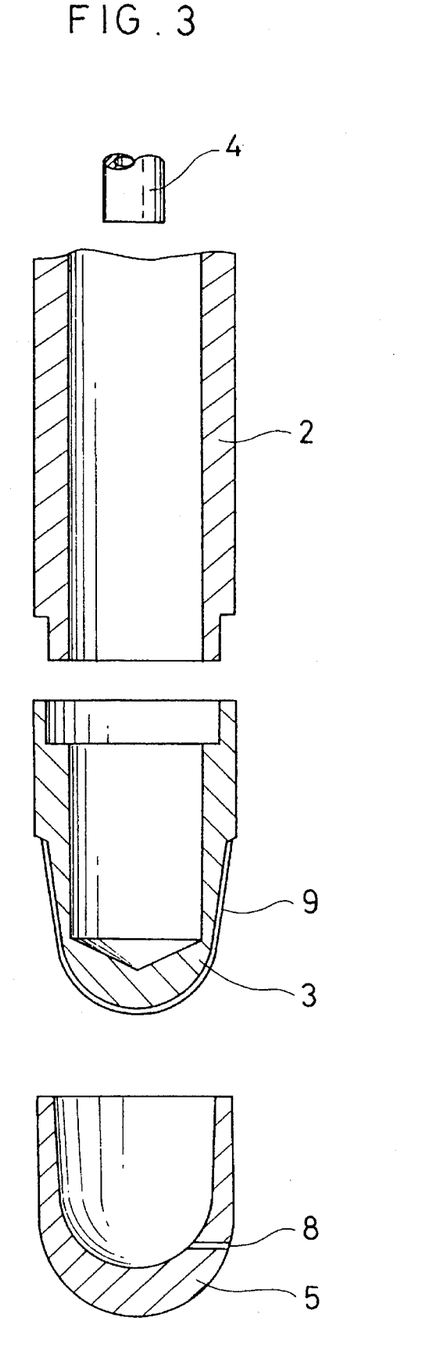
FIG. 3 is an exploded longitudinal sectional view of FIG. 1.

An electrode tip 5 has an inner surface which is larger in diameter as it advances towards its open end. The electrode tip 5 is dismountably fixed on the cap 3 such that a space 6 is defined by the inner surface of the electrode tip 5 and the outer surface of the cap 3 under the fixed condition. The electrode tip 5 is preferably made of a material with high heat conductivity such as the copper-containing alloy so as to enhance the cooling effect during welding operation. Referring to FIG. 2A, the electrode tip 5 has such a shape that it is readily turnable with a wrench or the like tool, such as two parallel planes 7 on the circumference as illustrated in FIG. 2A or a hexagonal wall as illustrated in FIG. 2b.

In the electrode tip 5 is provided a through hole 8 as a fluid passage extending between the space 6 defined by the head of the shank, the electrode tip, and the outside.

With the thus constructed electrode, spot welding can be conducted just in the same manner as with conventional electrodes. That is, a sufficient cooling effect is produced for this type electrode tip 5 by this indirect cooling system. When a worn or deformed electrode tip develops during welding operation, the electrode tip 5 can be removed from the shank 1 and ground for further use, or replaced by a new one, with no water leakage, even when water flow is not stopped. Thus, the spot welding electrode of this arrangement can omit the possibility of wetting a working place and of developing rust on the object to be welded. In addition, the spot welding electrode of this arrangement can omit the necessity of stopping the cooling water. Thus, the welding operation can be substantially simplified for effective welding operation.

When the electrode tip 5 is fixed onto the shank 1 by press-fitting, an electrically conductive lubricant 9 made of a mixture of grease and carbon is preferably applied on the outer surface of the cap 3 before fixing the electrode tip 5, thereby rendering it easier to mount or dismount the electrode tip 5 for replacement, while maintaining a sufficient electrical conductivity between the electrode tip 5 and the cap 3. However, it is possible to use grease alone as a lubricant. In such a case, grease partially applied on the cap 3 is removed therefrom by press-fitting the electrode tip 5, and the cap 3 and the electrode tip 5 are hermetically fixed together with the result that the high electric conductivity is maintained, while causing no problems in the welding operation.

Further, since the electrode tip 5 has the through hole 8, when the electrode tip 5 is to be fixed onto the cap 3 of the shank 1, air within the space 6 is exhausted to the outside via the through hole 8. Thus, the fixing of the electrode tip 5 onto the cap 3 can be readily and instantly made, but undesirable dropping off of the electrode tip 5 can be effectively avoided due to the hermetical contact between the tapered inner periphery of the electrode tip 5 and the tapered outer periphery of the cap 3.

In the above arrangements, the shank 1 preferably comprises the shank body 2 and the cap 3 which enables the both to be made of different metals. The shank 1 is thus manufactured in a cheap and simple manner. However, it is a matter of course that the shank 1 may be integrally formed as a unit, provided that the end of the shank 1 is closed.

Figure 4:
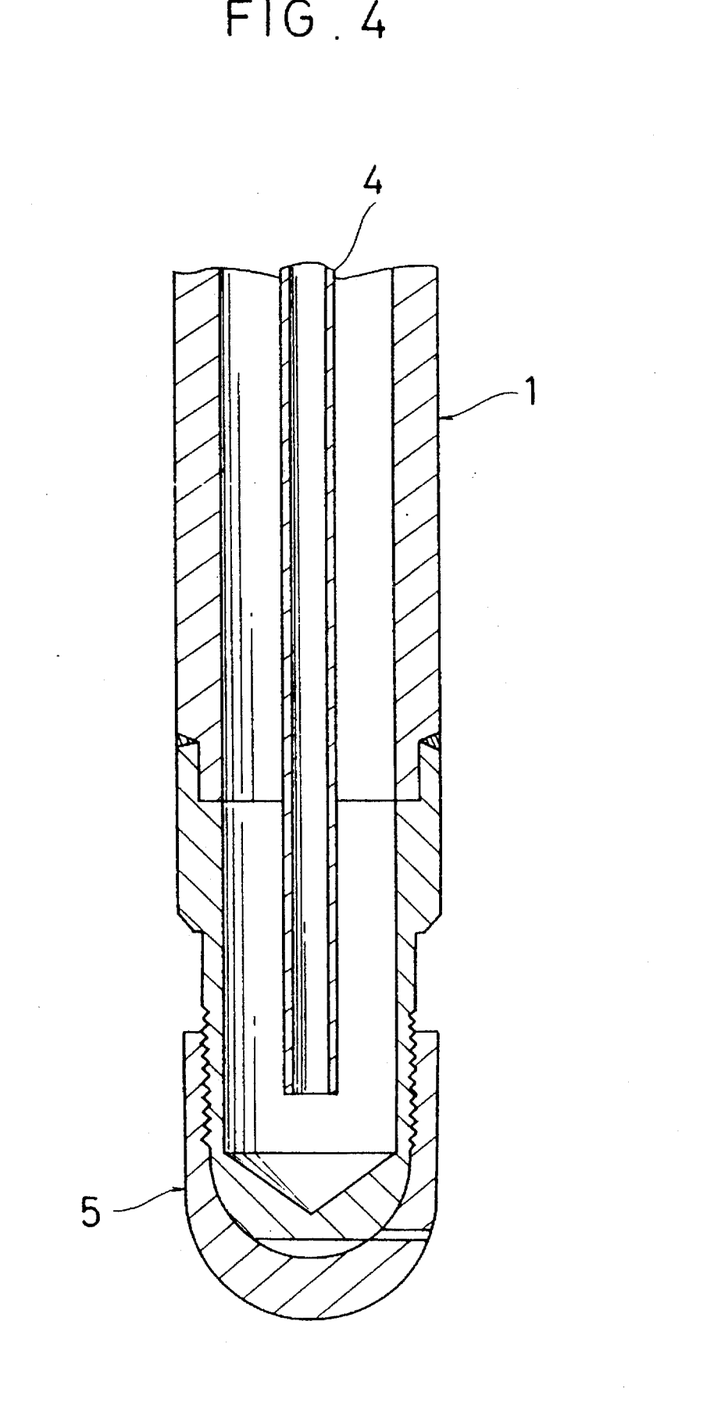
FIG. 4 is a longitudinal sectional view of the other embodiment of the spot welding electrode of the present invention.

Further, the fixing means between the electrode tip 5 and the shank 1 is not limited to the above embodiments, where the electrode tip 5 is press-fitted onto the shank 1. The electrode tip 5 may be screwed onto the shank 1 by providing threads on the inner periphery of the electrode tip 5 and the outer periphery of the shank 1, as illustrated in FIG. 4.

Figure 5:
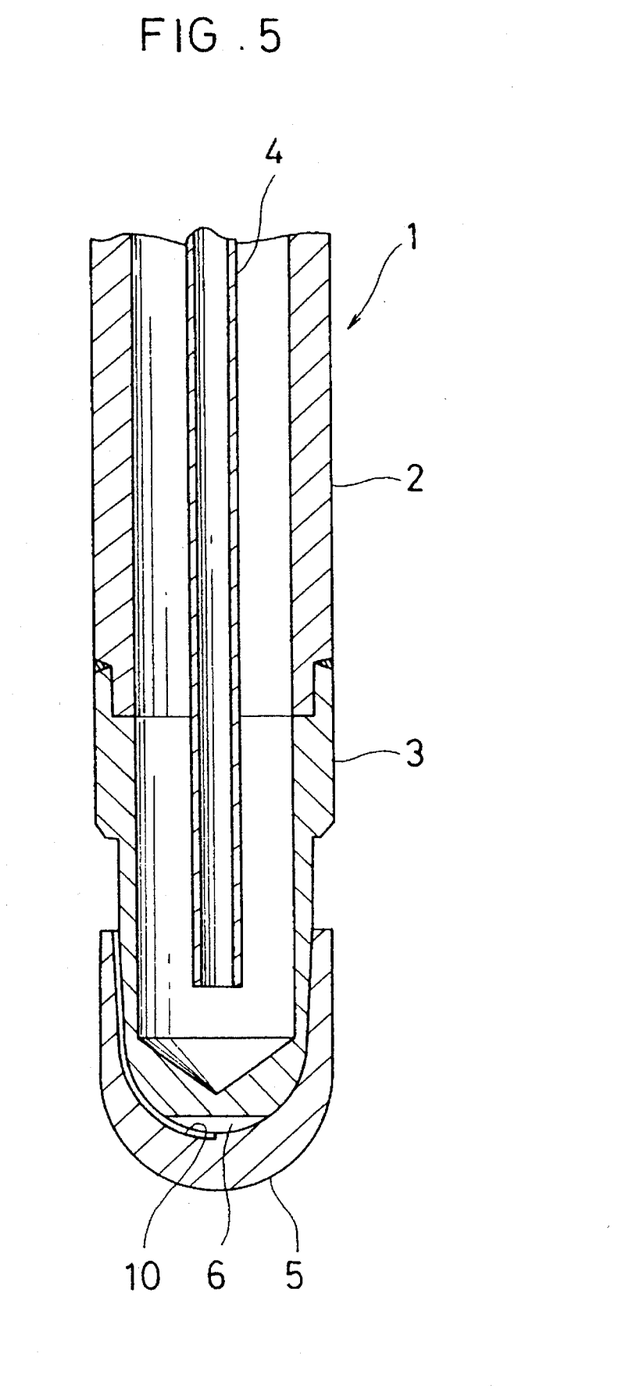
FIG. 5 is a longitudinal sectional view of the other embodiment of the spot welding electrode of the present invention.
Figure 6:
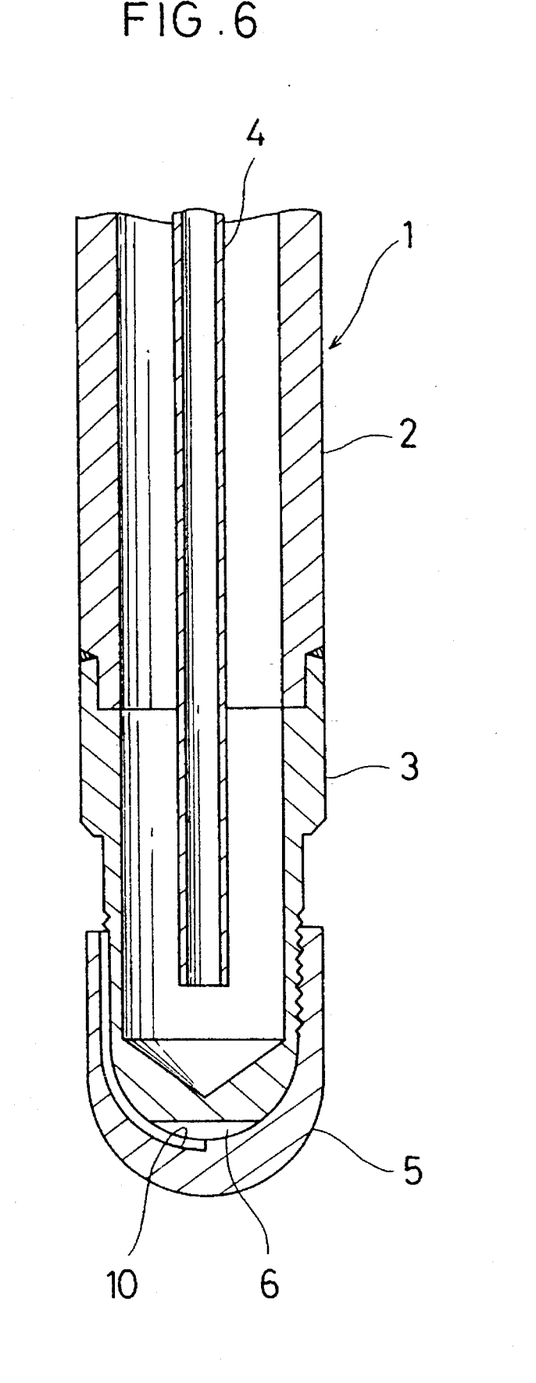
FIG. 6 is a longitudinal sectional view of another embodiment of the spot welding electrode of the present invention.

Although it is not necessary to provide a through hole in the electrode tip 5, when the fluid passage is to be formed, a groove 10 may be formed between the space 6 and the outside along the outer periphery of the top end of the shank 1 or the inner periphery of the electrode tip 5, as illustrated in FIGS. 5 and 6, which respectively illustrate different fixing means between the shank 1 and the electrode tip 5, namely, press-fitting and screwing.

Figure 7:
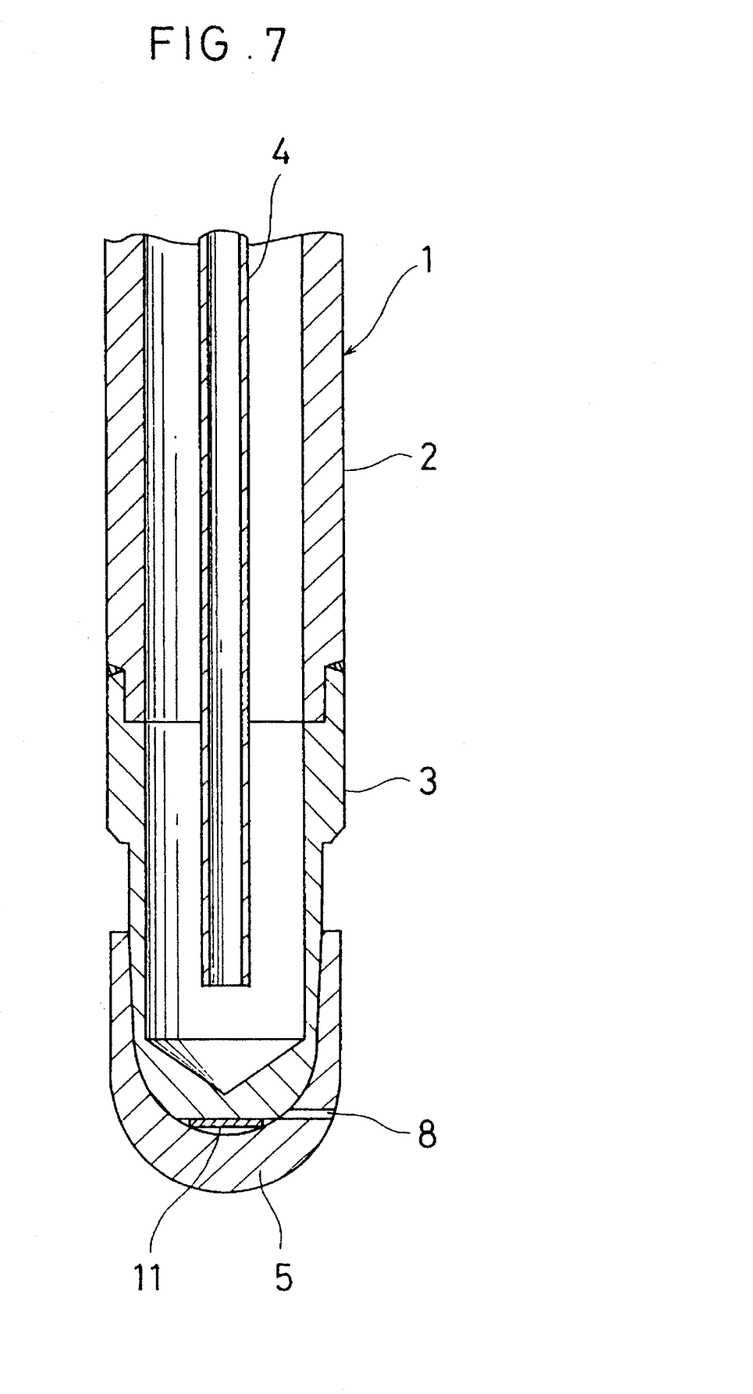
FIG. 7 is a longitudinal sectional view of yet another embodiment of the spot welding electrode of the present invention.

Referring to FIG. 7, an electrically bad or in other words, a poor conductive material 11 is provided on the top of the cap 3 of the shank 1. Whereby, when the electrode tip 5 accidentally drops off during welding operation, the bad conductive material touches the object to be welded to stop the electric current, which instantaneously makes aware of the accident and protects the shank 1 from damaging.

In the above embodiments, the spot welding electrode is formed of the shank, and the electrode tip 5 fixed on the shank has been described. However, the spot welding electrode may be formed of the electrode tip 5 only.

Further, various materials may be employed for the shank 1 and the electrode tip 5 within the scope of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. The spot welding electrode comprising a shank within which cooling water is communicated and an electrode tip, wherein said shank is provided on a top thereof with a closed head, on which said electrode tip is dismountably fixed;

wherein at least one of said shank and said electrode tip is provided with a fluid passage which extends between a space defined by said head of said shank and said electrode tip, and an outside surface; and wherein said fluid passage comprises a groove formed in at least one of an outer periphery of said shank and an inner periphery of said electrode tip.

2. The spot welding electrode comprising a shank within which cooling water is communicated and an electrode tip, wherein said shank is provided on a top thereof with a closed head, on which said electrode tip is dismountably fixed; and wherein an electrically poor conductive material is provided on the top of said shank.

3. The spot welding electrode comprising a shank within which cooling water is communicated and an electrode tip, wherein said shank is provided on a top thereof with a closed head, on which said electrode tip is dismountably fixed;

wherein at lest one of said shank and said electrode tip is provided with a fluid passage which extends between a space defined by said head of said shank and said electrode tip, and an outside surface; and wherein an electrically poor conductive material is provided on the top of said shank.

4. The electrode tip comprising an electrode tip that can be dismountably fixed on a head of a shank within which cooling water is communicated, and the electrode tip includes a fluid passage which extends to an outside surface, wherein said fluid passage comprises a groove formed in an inner periphery of said electrode tip.

* * * * *